(No Model.)

H. W. LIBBEY.
STEAM BICYCLE.

No. 583,809. Patented June 1, 1897.

UNITED STATES PATENT OFFICE.

HOSEA W. LIBBEY, OF BOSTON, MASSACHUSETTS.

STEAM-BICYCLE.

SPECIFICATION forming part of Letters Patent No. 583,809, dated June 1, 1897.

Application filed May 29, 1896. Serial No. 593,662. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Steam-Bicycles, of which the following, taken in connection with the accompanying drawings, is a specification.

My invention relates to improvements in bicycles to be propelled by steam-power.

The invention consists of a front steering-wheel and a rear driving-wheel having a double tread connected together by suitable framework and having a bed-plate between said wheels, but some distance below their centers. Upon the bed-plate is mounted a steam-boiler, a water-tank, and pump, and in suitable bearings secured to the under side of said bed-plate is mounted an oscillating steam-cylinder, the piston-rod of which operates a crank-shaft mounted in bearings secured to the upper side of the bed-plate, said crank-shaft being fitted at one or both ends with a sprocket-wheel which by a chain or chains communicates motion to a sprocket wheel or wheels secured to the axle of the driving-wheel. Below the boiler is supported a suitable lamp for heating same, all as hereinafter set forth, and pointed out in the claims.

Figure 1:
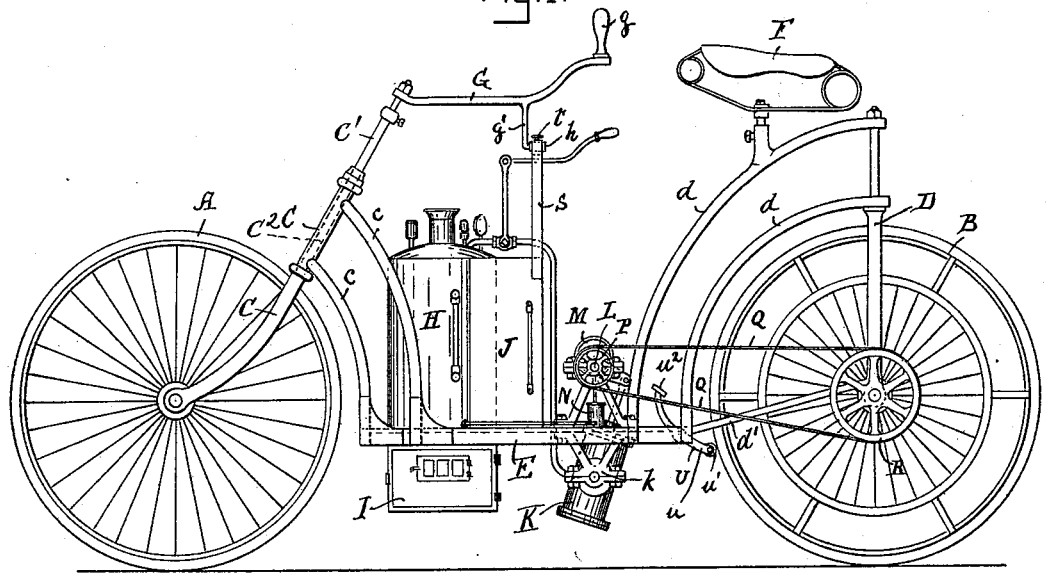
Figure 2:
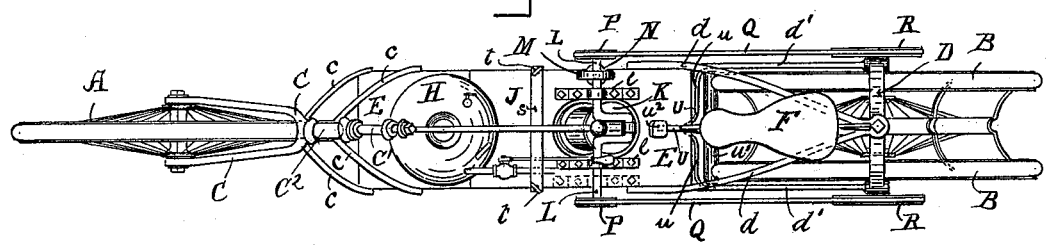
Figure 3:
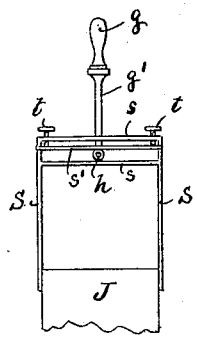

Referring to the accompanying drawings, Figure 1 represents a side view of a steam-bicycle embodying my invention. Fig. 2 is a plan or top view of same, and Fig. 3 is a detail.

A represents the front or steering wheel; B, the rear or driving wheel. The front wheel A is mounted in a fork C, inclined backward and having an extension C', that passes up through the head C², and the rear wheel B is mounted in a vertical fork D.

E is a bed-plate arranged between the wheels, but some distance below their center line. This bed-plate is connected to the fork-head C² and fork D by any suitable framework. In the drawings I have shown two bars *c c* on each side for connecting it to the front fork-head C² and two bars *d d* and a bar *d'* for connecting it to the rear fork D.

A saddle or seat F is supported in any suitable manner from one of the bars *d*, and the front-fork extension C' is fitted with a steering-bar G, that extends to near the saddle or seat F and is there fitted with a handle *g*, preferably upright, as shown, by which the rider is enabled to steer the vehicle in any desired direction. A holding device is also used in connection with this steering-bar, as hereinafter described.

On the front end of the bed-plate E is secured a steam-boiler H, which may be of any suitable construction and provided with the usual gages and other fittings. The boiler is heated by a lamp arranged in the lamp-chamber I under the boiler and below the bed-plate E.

J is a water-tank that is formed semicircular on one side, so as to fit around the boiler H.

To the under side of the bed-plate E at the rear of the water-tank are secured two bearings *k*, in which are mounted the trunnions of an oscillating steam-cylinder K, the piston-rod of which is connected to a crank-shaft L, mounted in suitable bearing *l*, secured to the upper side of the bed-plate E. On the crank-shaft is also an eccentric M, that operates a pump N for supplying water from the tank to the boiler by suitable pipe connection. The eccentric M may be held to the shaft by a suitable clutch arrangement, whereby the pump can be operated when desired, and when sufficient water is in the boiler the clutch can be thrown out, thus stopping the supply of water to the boiler. Upon each end of the crank-shaft is secured a sprocket-wheel P, which by a chain Q communicates motion to sprocket-wheels R, secured on the axle of the rear wheel B.

In order to hold the steering-bar G in any position the driver may require, (so that his hands will be free,) I secure to the top of the water-tank J or other suitable place a frame consisting of two uprights S and two cross-bars *s*, and also a loose bar *s'* between said cross-bars *s s*. The position of the loose bar *s'* is regulated by set-screws *t*, passing through the upper cross-bar *s*, and to the steering-bar G is secured a depending bar *g'*, to the lower end of which is attached a roller *h*, of rubber or other suitable flexible material, which roller works between the lower cross-bar *s* and the cross-bar *s'*, the tension upon the roller *h* being regulated by said set-screws *t*, so that when a proper tension is upon said roller it will retain the steering-bar in the position in which it has been placed by the rider. The said roller travels between the two bars when the steering-bar is operated by the rider.

U is a brake consisting of a split arm $u$, in the fork of which is mounted a rubber roller $u'$, and the other end of the arm is fitted with a foot-rest $u^2$ and is fulcrumed to the rear of the bed-plate E in front of the driving-wheel B, so that when the rider depresses the foot-rest $u$ the rubber roller will be forced into contact with the tires of the wheel; but as said roller is free to rotate there will not be any sudden or tearing action upon the tires.

Although I show and prefer to employ a driving-wheel B with a double tread, as shown and described in Letters Patent granted to me and dated the 24th day of January, 1883, No. 490,391, any other suitable wheel might be employed, and, if desired, said wheel may be driven by one set of sprocket-wheels.

What I claim is—

1. A bicycle consisting of a front steering-wheel and a rear driving-wheel connected together by a suitable frame; a bed-plate between said wheels and below their center; a boiler mounted upon the front end of said bed-plate; means for heating same arranged under the bed-plate; a water-tank at the rear of the boiler; an oscillating steam-cylinder mounted in bearings below the bed-plate; a crank-shaft operated by the piston-rod; and means for communicating motion from said crank-shaft to the driving-wheel, substantially as set forth.

2. A bicycle consisting of a front supporting and a rear driving wheel connected together by a suitable frame and bed-plate, the latter being below the centers of the wheels, of a seat upon the rear portion of the frame, a boiler upon the front portion, a semicircular water-tank between the seat and the boiler, a motor at the rear of the tank, and means for communicating motion to the driving-wheel, substantially as set forth.

3. In a bicycle, the combination, with a front and a rear fork, the front fork being provided with an extension, of a bed-plate, two bars for connecting each side of the plate with the front fork and two bars for connecting each side of the rear end of the plate with the rear fork, a seat upon two of the rear bars, a steam-boiler and motor upon the plate, means for communicating motion from the motor to the driving-wheels, and a handle extending from the extension nearly to the seat, substantially as set forth.

4. In combination with a steering-bar of a bicycle, a depending arm attached thereto, a roller on the end of said arm, a frame having a slot for said roller to work in, and means for pressing upon said roller, substantially as and for the purpose set forth.

In testimony whereof I have signed my name to this specification, in the presence of two subscribing witnesses, on this 31st day of March, A. D. 1896.

HOSEA W. LIBBEY.

Witnesses:
 CALEB H. SWAN,
 EDWIN PLANTA.